United States Patent
Ross et al.

(10) Patent No.: US 8,820,046 B2
(45) Date of Patent: Sep. 2, 2014

(54) METHODS AND SYSTEMS FOR MITIGATING DISTORTION OF GAS TURBINE SHAFT

(75) Inventors: Steven A. Ross, Cincinnati, OH (US); Thomas E. Agin, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 976 days.

(21) Appl. No.: 12/890,542

(22) Filed: Sep. 24, 2010

(65) Prior Publication Data
US 2011/0232294 A1 Sep. 29, 2011

Related U.S. Application Data

(60) Provisional application No. 61/248,554, filed on Oct. 5, 2009.

(51) Int. Cl.
*F02C 9/00* (2006.01)
*F01K 13/00* (2006.01)
*F02C 7/26* (2006.01)

(52) U.S. Cl.
CPC ...................... *F02C 7/26* (2013.01); *F05D 2270/114* (2013.01)
USPC .......................................... 60/39.13; 60/646

(58) Field of Classification Search
USPC ........... 60/39.13, 646, 658, 39.091, 778, 779, 60/39.24, 786, 787
See application file for complete search history.

(56) References Cited

U.S. PATENT DOCUMENTS

| | | | | |
|---|---|---|---|---|
| 2,617,253 | A * | 11/1952 | Fusner et al. | 60/39.091 |
| 4,069,424 | A * | 1/1978 | Burkett | 307/87 |
| 4,121,424 | A * | 10/1978 | Sato et al. | 60/646 |
| 4,211,070 | A * | 7/1980 | Portmann | 60/39.08 |
| 4,437,809 | A * | 3/1984 | Nutter | 415/41 |
| 4,453,407 | A | 6/1984 | Sato | |
| 4,456,830 | A | 6/1984 | Cronin | |
| 4,473,752 | A | 9/1984 | Cronin | |
| 4,507,926 | A * | 4/1985 | Teckentrup et al. | 60/656 |
| 4,733,529 | A | 3/1988 | Nelson | |
| 4,903,537 | A * | 2/1990 | Bahrenburg | 74/125.5 |
| 4,905,810 | A * | 3/1990 | Bahrenburg | 477/10 |
| 6,253,537 | B1 * | 7/2001 | Suenaga et al. | 60/773 |
| 7,507,070 | B2 | 3/2009 | Jones | |
| 2005/0271499 | A1 | 12/2005 | Loy | |

(Continued)

FOREIGN PATENT DOCUMENTS

GB 2117842 A 10/1983

OTHER PUBLICATIONS

W. Diepolder, "Design Features and Procedures to Reduce the Phenomenon of HP-Rotor Bow on Jet Engines", found http://www.mtu.de, accessed Sep. 25, 2009.

*Primary Examiner* — Gerald L Sung
(74) *Attorney, Agent, or Firm* — General Electric Co.; Steven J. Rosen

(57) ABSTRACT

Methods and systems for mitigating distortion of a shaft of a gas turbine engine are provided. One method comprises at least one step of applying intermittent rotary power to a shaft of a gas turbine engine. The step of applying intermittent power to the shaft is performed during a period where conditions of temperature differential in the engine exist capable of distorting the shaft. The methods and systems shorten the time needed to start a gas turbine engine in such a way that bowing of a shaft is not a significant problem.

8 Claims, 2 Drawing Sheets

(56) References Cited

U.S. PATENT DOCUMENTS

| | | |
|---|---|---|
| 2006/0024164 A1 | 2/2006 | Keith |
| 2008/0066444 A1 | 3/2008 | Cornelius |
| 2008/0120841 A1 | 5/2008 | Ring |
| 2008/0190094 A1* | 8/2008 | Kauf et al. .................. 60/39.182 |
| 2011/0138816 A1* | 6/2011 | Takeda et al. ................... 60/772 |

* cited by examiner

US 8,820,046 B2

METHODS AND SYSTEMS FOR MITIGATING DISTORTION OF GAS TURBINE SHAFT

CROSS REFERENCE TO RELATED APPLICATIONS

This application is a non-provisional utility application claiming priority under 35 U.S.C. 119(e) of prior-filed provisional application Ser. No. 61/248,554, filed 5 Oct. 2009, entitled "METHODS AND SYSTEMS FOR MITIGATING DISTORTION OF GAS TURBINE SHAFT", which is hereby incorporated by reference in its entirety.

FIELD OF THE INVENTION

The present invention generally relates to methods and systems for mitigating distortion of a shaft of a gas turbine engine. In particular, some embodiments herein relate to methods and systems for mitigating bowing of a high pressure shaft of a turbofan engine.

BACKGROUND

It has been generally observed that certain gas turbine engines, e.g. aircraft turbofan engines, cool unevenly following shutdown of the engine. Typically, it has been observed that the top of the engine may remain remaining hotter than the bottom of the engine for a period of time after shutdown. Because of convection effects the bottom part of the engine cools more quickly than does the top part. It has been further observed that this uneven cooling may cause a top of a shaft in the turbine being hotter than the bottom of the shaft.

Owing to thermal expansion of the material, the net result of this temperature differential can often be that the shaft becomes distorted, where typically this distortion is in the form of a "bowing" (sometimes referred to as "hogging"), usually upwardly, of the shaft. The shaft may become eccentric relative to its axis, taking on an effectively arcuate shape instead of being generally cylindrical. This distortion may become problematic if a start is attempted with an aviation gas turbine engine in this condition. In such instances, the shaft eccentricity will result in vibrations which may be felt in the airplane, or may result in rubbing of a rotor blade or fan blade so as to negatively affect performance of the turbine.

Methods proposed for dealing with the bowing problem have included provision of a drive to keep the engine rotors turning for some time after the engine has shut down. This may, in itself, require the expenditure of a considerable amount of power and has other potentially undesirable effects. One specific method for addressing the problems attendant to starting a gas turbine engine having a shaft in a distorted or bowed state, is to "motor" the affected shaft, such that it is powered and rotated to a running speed (usually a continuous running speed) during the start procedure and prior to addition of fuel to the turbine. Such motoring has been beneficial in bringing in airflow into the engine core, so that any temperature disparity can be evened out. However, such extended motoring may be undesirable owing to the consumption of power. Furthermore, such extended motoring typically lengthens the start time, and undesirable bowed-rotor vibration may be encountered during the motoring. This may be especially problematic in some newer turbofan engines.

Thus, there remains a need to shorten the time needed to start a gas turbine engine in such a way that bowing of a shaft is not a significant problem.

BRIEF SUMMARY OF THE INVENTION

One embodiment of the present invention is directed to a method for mitigating distortion of a shaft of a gas turbine engine, the method comprising at least one step of applying intermittent rotary power to a shaft of a gas turbine engine. This one or more step of applying intermittent power to the shaft is performed during a period where conditions of temperature differential in the engine exist which are capable of distorting the shaft.

A further embodiment of the present invention is directed to a method for mitigating bowed rotor starts of a gas turbine engine. The method comprises steps of (a) stopping the engine; and thereafter, (b) applying intermittent rotary power to a shaft of a gas turbine engine during a condition of thermal differential in the engine capable of distorting the shaft; (c) stopping the applying of rotary power to the shaft; and (d) starting the engine.

A yet further embodiment of the present invention is directed to a system for operating a gas turbine engine. The system comprises (a) at least one sensor configured to determine at least one engine operating parameter; (b) auxiliary rotary power supply unit; and (c) a controller coupled to the at least one sensor and to the auxiliary rotary power supply unit. The controller is configured to apply at least one pulse signal to the auxiliary rotary power supply unit for applying intermittent rotary power to a shaft of a gas turbine engine when the at least one engine operating parameter is within a preselected value.

Other features and advantages of this invention will be better appreciated from the following detailed description.

BRIEF DESCRIPTION OF THE DRAWINGS

Embodiments of the invention will now be described in greater detail with reference to the accompanying Figures.

FIG. 1A is an enlarged cross-sectional view of the engine illustrated in FIG. 1.

DETAILED DESCRIPTION

Figure 1:
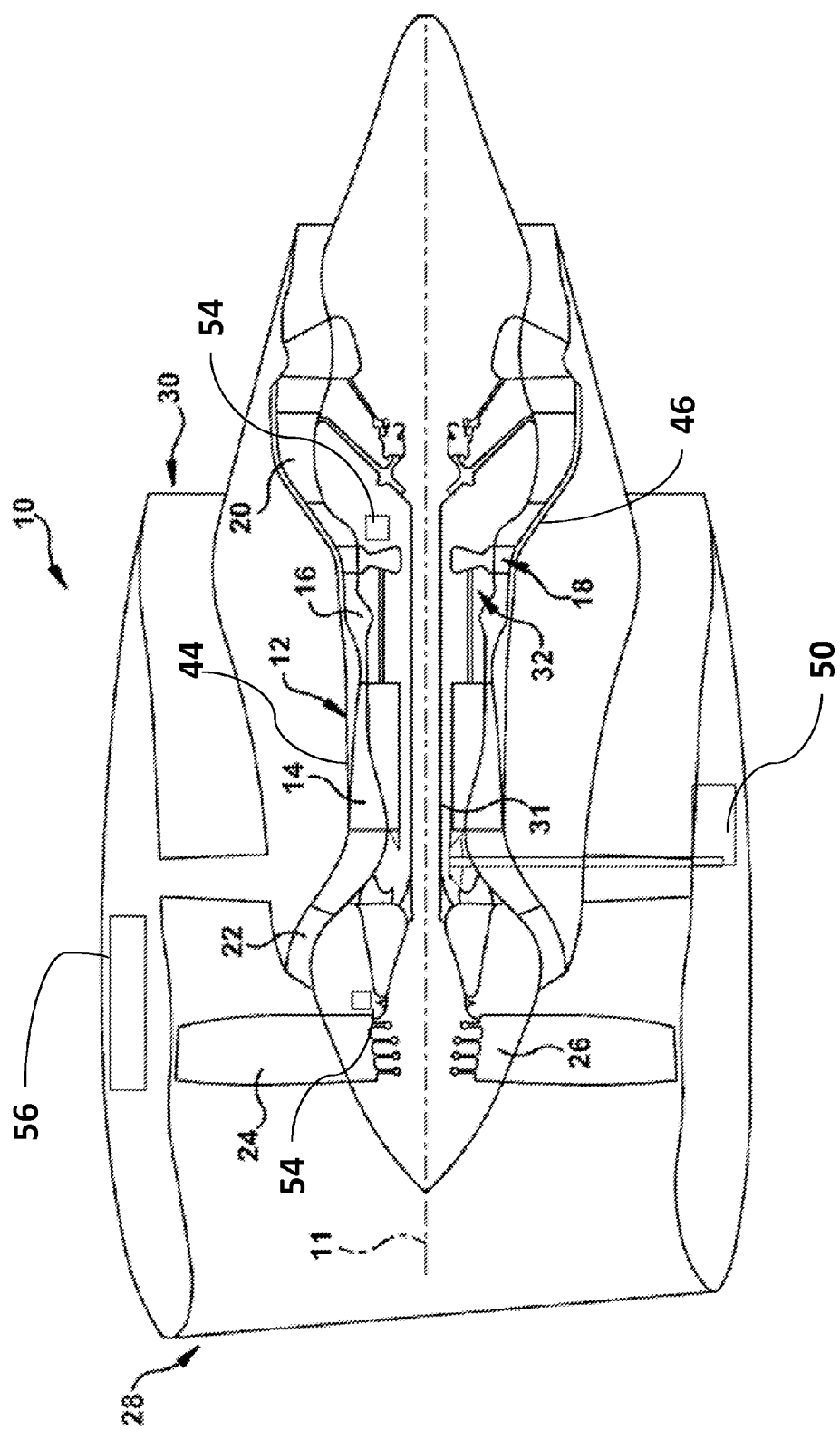
FIG. 1 is a cross-sectional view of a typical turbofan engine assembly.

In accordance with embodiments, there are provided methods for mitigating distortion of a shaft of a gas turbine engine. As used herein, the term "mitigating" is taken to have substantially the same meaning as "ameliorating". It typically refers to lessening a severity or extent of distortion. As used herein, the term "shaft" will be employed substantially interchangeably with the term "rotor". In some embodiments, the distortion of interest may refer to the bowing or hogging of a shaft, where it may take on a curved or arcuate shape. Often, owing to higher temperatures at the top of an engine than a bottom of an engine (as occurs after engine shutdown), the bowing of a shaft will be in the upward direction, at least initially. To mitigate the problem, embodiments of the invention employ one or more steps where rotary power is applied intermittently to a shaft of a gas turbine engine, while there exists a temperature differential in the engine which capable of distorting the shaft. The term "intermittently" is to be taken as distinguished from "continuously". Prior art methods of motoring the affected shaft are considered to have rotary power applied continuously thereto, at least for some period of time. In contrast, embodiments of the present invention apply rotary power in an intermittent or pulsing fashion. Preferably, embodiments of the present invention never apply power continuously.

There are several modes in which intermittent rotary power can be applied. In some embodiments, the applying of intermittent rotary power comprises the steps of providing sufficient power to rotate the shaft and thereafter removing power. Typically, this is performed by applying only just enough power such that rotation can be detected as having occurred on the shaft of interest, and then stopping the application of power. In some embodiments, the shaft is allowed to come to rest after the removing or stopping of application of power. Typically, the applying of rotary power comprises providing sufficient power to rotate the shaft substantially without the shaft having a constant rotary speed. In other words, a pulse or short burst of power is given, generally just enough to cause one or more rotation of the shaft, but the shaft never attains a constant speed. Instead, in this embodiment, it may have a varying rotational speed, one in which (immediately after the application of power) the shaft takes on an increasing rotational speed, and then, after power application is stopped, it takes on a decreasing rotational speed.

Without being limited by the following theory, it is believed that these modes of applying intermittent rotary power may serve to reposition a bowed portion of the shaft. In particular, for a shaft which comprises a bowed portion, the steps of providing sufficient power to rotate the shaft and thereafter removing power, may serve to allow the bowed portion of the shaft to rotate under gravity. For example, if a substantially horizontal rotor is in an initial state of having its bowed portion facing upwards, then application of the pulses or the intermittent rotary power may reposition the bowed portion such that it is facing in a different direction, e.g., downward. This may occur since a bowed portion is usually heavier. Nevertheless, the operation of the present invention is not to be construed as limited by this theory.

In certain embodiments, the gas turbine engine in which rotor distortion is to be mitigated is a turbofan engine (e.g., a high bypass ratio turbofan engine or low bypass ratio turbofan engine), a bypass turbojet engine, or turboprop. In many such engines, the gas turbine engine comprises (in serial flow communication): a fan, compressor, combustor, high pressure turbine, and low pressure turbine. The fan and the low pressure turbine are operatively coupled by a first (or low pressure or "LP") shaft, and the compressor and the high pressure turbine are operatively coupled by a second (or high pressure or "HP") shaft. Embodiments of the invention applied to turbofan engines may include a step where applying intermittent rotary power comprises providing sufficient power to rotate the HP shaft, yet substantially without rotating the LP shaft or the fan. In other embodiments, the gas turbine engine may be aeroderivative marine and industrial engines, such as LM6000 or LM2500 engines available from General Electric Company, Evendale, Ohio.

In accordance with embodiments of the invention, the method may further comprise repeating the at least one step of applying intermittent rotary power to the shaft. That is, it may be advantageous to perform this "pulsing" (i.e., application of intermittent rotary power as described above), more than one time after shutdown or prior to startup of the gas turbine engine.

Generally, the temperature differential in the engine is considered to exist between an upper portion 44 of the engine and a lower portion 46 of the engine. In many embodiments, the temperature differential of concern falls between about 25° F. and about 300° F. Thus, in embodiments, the application of intermittent rotary power is conducted when such a temperature differential exists between an upper portion of the engine and a lower portion of the engine, because such differential often gives rise to conditions capable of bowing or otherwise distorting a shaft of a gas turbine engine.

In accordance with embodiments of the invention, the one or more step of applying intermittent rotary power may occur at a time period within about 10 min and 8 h after shutdown (e.g., after start of the shutdown sequence) of the engine. In accordance with embodiments of the invention, the one or more step of applying intermittent rotary power may occurs at a time within about 5 minutes to about 2 hours prior to startup (e.g., prior to commencement of startup procedure) of the engine. None of the alternative embodiments of the invention described herein should be construed as being mutually exclusive. Therefore, it may be that the same application of a pulse occurs both 1 h after shutdown and 1 h prior to startup of the engine, depending upon conditions for use of the engine (e.g., an airplane with a turbofan engine is undergoing deplaning and refueling for departure). In a further embodiment, intermittent rotary power may be applied during a portion of a startup procedure, but prior to addition of fuel to the engine.

In accordance with aspects of the invention, intermittent rotary power may be provided by a variety of effective means. It may be convenient to provide the intermittent rotary power by an electric motor 50 (e.g., an APU, auxiliary power unit) or by a pneumatic power unit (e.g., air turbine starter).

Another aspect of the invention provides a method for mitigating bowed rotor starts of a gas turbine engine. When starting a gas turbine engine having a bowed rotor, undesirable vibrations may be encountered, which must be lessened in severity. Therefore, this method includes (a) stopping the engine; and thereafter, (b) applying intermittent rotary power to a shaft of a gas turbine engine during a condition of thermal differential in the engine capable of distorting the shaft, and then (c) stopping the applying of rotary power to the shaft. Thereafter, the engine is started, e.g., fuel is added under suitable conditions. Preferably, steps (b) and (c) are repeated in sequence more than once prior to starting the engine. Any of the above-noted methods of applying intermittent rotary power are equally applicable to this aspect of the invention.

It may be desirable for the above-described application of intermittent rotary power to mitigate shaft distortion, to occur automatically or without user intervention. Therefore, another aspect of the invention provides a system for operating a gas turbine engine, the system comprising at least one sensor 54 which is configured to determine at least one engine operating parameter; an auxiliary rotary power supply unit 50; and a controller 56 coupled to the at least one sensor and to the auxiliary rotary power supply unit. The controller is configured to apply at least one pulse signal to the auxiliary rotary power supply unit for applying intermittent rotary power to a shaft of a gas turbine engine when the at least one engine operating parameter is within a preselected value.

In the above aspect, the sensor may be configured to determine a "stopped" state of the gas turbine engine. That is, the sensor may have the capability of determining whether one or more shaft of the gas turbine engine has spooled down after use, or whether the engine has completed its shutdown sequence. With suitable control logic, the sensor may also directly or indirectly be capable of determining the time since engine shutdown. The sensor may be alternatively (or additionally) configured to determine engine temperature parameters. Such engine temperature parameters may include determination of temperature at one, two, or more locations in the engine. For instance, from the point of view of gauging the possibility of bowing of a rotor, sensors configured to determine a temperature differential in the engine may be provided.

The system for operating a gas turbine engine also comprises an auxiliary rotary power supply unit. It may be convenient for such auxiliary rotary power supply unit to comprise an electrically-powered motor, or be a pneumatic power unit (e.g., one which is capable of providing flow of gas to turn a fan and thus an affected shaft).

In general, the system for operating a gas turbine engine also comprises a controller coupled to the at least one sensor and to the auxiliary rotary power supply unit. The controller is configured to apply at least one pulse signal to the auxiliary rotary power supply unit, for applying intermittent rotary power to a shaft of a gas turbine engine when the at least one engine operating parameter is within a preselected value. The modes of applying intermittent rotary power to a shaft are substantially the same as those as described above. Typically, the pulse signal is only sent to the auxiliary rotary power supply unit when a sensed engine operating parameter is within a preselected value. For example, if the at least one engine operating parameter comprises temperature differential in the engine, then the preselected value may be a temperature differential in the range of from about 25° F. to about 300° F. As a further example, if the at least one engine operating parameter comprises time since engine shutdown, then the preselected value may be a time since shutdown in the range of from about 10 min to about 8 hr. In such manner, the system may provide for automated initiation of suitable rotation of an affected shaft, such that shaft distortion (e.g., HP rotor bowing) is mitigated.

In order to ensure that only intermittent rotary power is applied to an affected shaft, the system may further comprise a rotation sensor 54 for detecting rotary motion of the shaft, which rotation sensor is further coupled to the controller. Thus, if the rotation sensor detects that the shaft is rotating, the controller is configured to send a remove power signal to the auxiliary rotary power supply unit. In other words, to facilitate the pulsing of a shaft, the controller first may apply a signal to the auxiliary rotary power supply unit in order to bring the shaft into motion, but once the shaft is detected as being in motion, the application of power is withdrawn, and the shaft allowed to spool down.

For safety reasons, the controller may be further configured to send an abort signal to the auxiliary rotary power supply unit when a safety condition is present. Such a safety condition may occur when the engine is open for repair or inspection, or when personnel may come too close to moving parts of an engine. In such instances, the controller may abort the auxiliary rotary power supply unit, in order to bring a shaft into a safe condition. A safe condition may be facilitated by an auxiliary rotary power supply unit which is configured to apply a braking torque to the shaft when a safety condition is present.

The automated system described above may be included as part of a standard power-on sequence for an aircraft. It may be applied to an electric start engine or to a traditional pneumatic start engine. The controller described herein may be a standalone device, or may be a component of a general airplane control system.

Turning now to FIG. 1, this shows a cross-sectional view of a typical turbofan engine assembly 10 having a longitudinal axis 11. In the exemplary embodiment, turbofan engine assembly 10 includes a core gas turbine engine 12 that includes a high-pressure compressor 14, a combustor 16, and a high-pressure turbine 18. Turbofan engine assembly 10 also includes a low-pressure turbine 20 that is coupled axially downstream from core gas turbine engine 12, and a fan assembly 22 that is coupled axially upstream from core gas turbine engine 12. Fan assembly 22 includes an array of fan blades 24 that extend radially outward from a rotor disk 26. Engine 10 has an intake side 28 and an exhaust side 30. In the exemplary embodiment, turbofan engine assembly 10 is a GE90 gas turbine engine that is available from General Electric Company, Cincinnati, Ohio. Core gas turbine engine 12, fan assembly 22, and low-pressure turbine 20 are coupled together by a first rotor shaft 31 (sometimes referred to as the LP shaft), and compressor 14 and high-pressure turbine 18 are coupled together by a second rotor shaft 32 (sometimes referred to as the HP shaft).

In operation, air flows through fan assembly blades 24 and compressed air is supplied to high pressure compressor 14. The air discharged from fan assembly 22 is channeled to compressor 14 wherein the airflow is further compressed and channeled to combustor 16. Products of combustion from combustor 16 are utilized to drive turbines 18 and 20, and turbine 20 drives fan assembly 22 via shaft 31. Engine 10 is operable at a range of operating conditions between design operating conditions and off-design operating conditions. In the context of engine shutdown, a temperature differential may develop in the engine owing to convection, and as a result the HP and/or LP rotors may be affected by thermal induced distortions. In such instances, distortion can result in vibrations which may be felt in the airplane, or may result in rubbing of a rotor blade or fan blade so as to negatively affect performance of the turbine. Methods and systems of the present disclosure serve to lessen the observed vibrations while shortening the required start time, as compared to prior methods.

In order to promote a further understanding of the invention, the following example is provided. The example is illustrative, and should not be construed to be any sort of limitation on the scope of the invention.

Example

A test was performed on a GEnx-1B type turbofan engine (GEnx is a trademark of General Electric Company). Vibrations ("vibes") were measured as a function of relative start time, i.e., time after start of engine (in arbitrary time units). Vibrations were measured in terms of ips units (inches per second), generally a measure of peak amplitude of the vibration.

Figure 2:
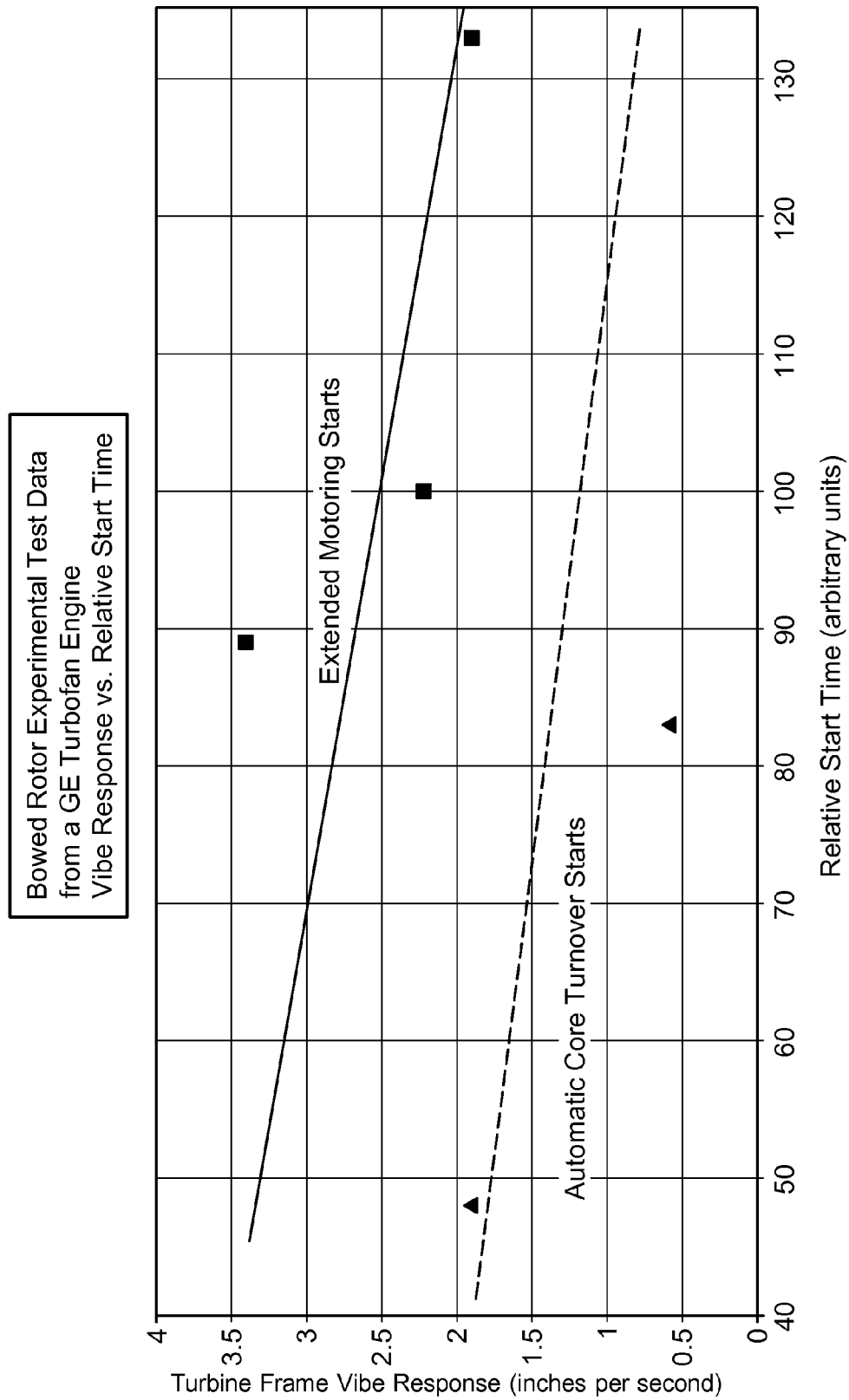
FIG. 2 shows a comparative plot of observed vibrations measured as a function of start time.

The top graph (i.e., solid line) of FIG. 2 refers to a procedure where extended motoring time was performed on the engine during the start procedure prior to fuel on. This extended motoring was conducted in such a manner that airflow through the engine core evened out the temperature disparity between the top and bottom of the rotor. Vibrations were measured as a function of start time. However, the extended motoring was seen to lengthen the start time, as compared to the application of intermittent rotary power in accordance with embodiments of the invention. By following the procedures of the present disclosure (referred to as Automated Core Turnover Starts in FIG. 2), it was possible to achieve vibration levels under 2.0 ips, with a start of less than 50% relative to an arbitrary time unit of 100 for an exemplary situation using extended motoring. This is shown in the bottom plot (i.e., broken line) of FIG. 2. In contrast, the extended motoring starts could not achieve this low level of vibration without a start time of over 130 in relative time units.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" used in connection with a quantity is inclusive of the stated value and has the meaning dictated by the context (for example, includes the degree of error associated with the measurement of the particular quantity). "Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present. The singular forms "a", "an" and "the" include plural referents unless the context clearly dictates otherwise. All ranges disclosed herein are inclusive of the recited endpoint and independently combinable.

As used herein, the phrases "adapted to," "configured to," and the like refer to elements that are sized, arranged or manufactured to form a specified structure or to achieve a specified result. While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description. It is also anticipated that advances in science and technology will make equivalents and substitutions possible that are not now contemplated by reason of the imprecision of language and these variations should also be construed where possible to be covered by the appended claims.

What is claimed is:

1. A system for operating a gas turbine engine:
   (a) at least one sensor configured to determine at least one engine operating parameter;
   (b) auxiliary rotary power supply unit;
   (c) a controller coupled to the at least one sensor and to the auxiliary rotary power supply unit,
   wherein the controller is configured to apply at least one pulse signal to the auxiliary rotary power supply unit for applying intermittent rotary power to a shaft of a gas turbine engine when the at least one engine operating parameter is within a preselected value,
   wherein the applying intermittent rotary power includes pulsing rotary power to the shaft sufficient to cause rotation of the shaft, and
   the pulsing includes applying pulses of rotary power wherein each pulse causes one or more rotations of the shaft.

2. The system according to claim 1, wherein the engine operating parameter is selected from one or more of stopped state of engine, time since engine shutdown, engine temperature parameters.

3. The system according to claim 1, wherein the at least one engine operating parameter comprises temperature differential in the engine.

4. The system according to claim 1, wherein the at least one engine operating parameter comprises time since engine shutdown.

5. The system according to claim 1, wherein the controller is configured to send an abort signal to the auxiliary rotary power supply unit when a safety condition is present.

6. The system according to claim 5, wherein the auxiliary rotary power supply unit is configured to apply a braking torque to the shaft when the safety condition is present.

7. The system according to claim 1, further comprising a rotation sensor for detecting rotary motion of the shaft and the controller is further coupled to the rotation sensor.

8. The system according to claim 7, wherein the controller is configured to send a remove power signal to the auxiliary rotary power supply unit at a time when rotation is sensed.

* * * * *